(12) United States Patent
Grohowski

(10) Patent No.: US 7,326,274 B2
(45) Date of Patent: Feb. 5, 2008

(54) BINDER COMPOSITIONS AND METHODS FOR BINDER ASSISTED FORMING

(75) Inventor: Joseph A. Grohowski, Glens Falls, NY (US)

(73) Assignee: Praxis Powder Technology, Inc., Queensbury, NY (US)

( * ) Notice: Subject to any disclaimer, the term of this patent is extended or adjusted under 35 U.S.C. 154(b) by 424 days.

(21) Appl. No.: 10/272,798

(22) Filed: Oct. 17, 2002

(65) Prior Publication Data

US 2003/0075013 A1    Apr. 24, 2003

(51) Int. Cl.
*B22F 1/00* (2006.01)
*C01M 125/04* (2006.01)
*C01M 107/04* (2006.01)
*C01M 107/34* (2006.01)

(52) U.S. Cl. .................. 75/252; 508/150; 508/579; 508/591

(58) Field of Classification Search ............. 75/252; 508/150, 579, 591
See application file for complete search history.

(56) References Cited

U.S. PATENT DOCUMENTS

| | | | |
|---|---|---|---|
| 5,059,388 A * | 10/1991 | Kihara et al. ............. 419/37 |
| 5,380,179 A * | 1/1995 | Nishimura et al. ......... 419/36 |
| 5,611,978 A * | 3/1997 | Truebenbach ............. 264/656 |
| 5,641,920 A | 6/1997 | Hens et al. |
| 5,665,289 A * | 9/1997 | Chung et al. ............. 264/628 |
| 5,860,055 A * | 1/1999 | Hesse et al. ............. 419/36 |
| 5,950,063 A | 9/1999 | Hens et al. |
| 6,641,640 B1 * | 11/2003 | Hesse et al. ............. 75/236 |
| 6,682,581 B1 * | 1/2004 | Speidel .................. 75/252 |

* cited by examiner

Primary Examiner—Roy King
Assistant Examiner—Ngoclan T. Mai
(74) Attorney, Agent, or Firm—Oliver A. M. Zitzmann

(57) ABSTRACT

Multiphase polymeric binders for binder assisted forming of sinterable powder bodies are formulated to demonstrate improved rheological properties in the form of newtonion or near newtonion flow behavior thereby reducing dependence of binder viscosity on shear by tailoring the molecular weight and molecular weight distribution of the polymeric binder phases and the resulting polymer admixtures of the invention demonstrate shear rate independent behavior. Reduction of interfacial tension between binder phases by introduction of at least one macromolecule with separate segments selected to be compatible with the individual phases of the binder further increases processing performance as does use of polymer macromolecules having attributes that allow them to act as surface active materials at the interface of the sinterable powder and the multiphase binder composition. Predispersion of the surface active materials in the powder is facilitated by emulsification thereof in water prior to admixture with the powder.

31 Claims, 5 Drawing Sheets

BINDER COMPOSITIONS AND METHODS FOR BINDER ASSISTED FORMING

The present invention is directed to binder assisted forming or molding of powders and other small particulate materials of micron and submicron sizes in various coherent shapes for subsequent processing. Such powder materials can be solid, hollow, spherical, or irregular in shape and physical construction. The binder compositions of this invention are multi phase formulations that can include special purpose additives or components that enhance the basic binder materials which function to form and maintain the shape of the molded article.

BACKGROUND OF THE INVENTION

There presently exist many technologies for forming of sinterable powders such as metals, ceramics, carbides, oxides, hydrides and the like via binder assisted forming methods. Sinterable powders can be admixed with temporary binder compositions and formed by a variety of forming techniques including pressure molding, injection molding, and extrusion. The admixtures of powder and binder are generally referred to as feedstock materials or compositions. After being formed into a shaped body or part, the binder is removed and the powders are sintered to produce the final product. This final product may have open porosity, closed porosity, or be completely dense.

The binder generally comprises polymers and other organic chemicals. Various methods can be employed to remove the binder from the part prior to or during sintering or other processing operations. Some binders are completely removed by thermal methods in a controlled fashion, others have multiple phases or components that are removed sequentially by extraction, catalytic decomposition, or thermal treatment.

Binder removal is frequently referred to as debinding. Multi phase binders frequently include an extractable phase, which is removed first, and a backbone phase that is removed after the extractable phase. The extractable phase is usually a material that can be conveniently removed by non-thermal means such as a solvent extraction or a catalytic decomposition method. The solvent is typically an organic solvent or water. Additionally, the extractable phase may be removed thermally by evaporation or sublimation. After removal of the extractable phase the remaining binder backbone components are generally thermally decomposed leaving the part or body essentially free of all of the temporary binder materials or components.

Many formulations use a relatively substantially high molecular weight polymer as the backbone phase and a lower molecular weight material such as a wax or similar lower molecular weight material or chemical as the extractable phase. The backbone polymer provides strength necessary to allow forming and subsequent handling and processing of the molded body. The lower molecular weight extractable phase materials are used to plasticize the backbone phase. This imparts much lower viscosity to the feedstock, powder plus binder, and allows parts to be more easily formed. The extractable phase is typically removed via solvent immersion and lower molecular weight materials are more readily removed by this technique.

There are multitudes of binder compositions that reflect this general formulation strategy. A common binder system formulation uses a polypropylene or polyethylene as a backbone and a wax as the extractable phase. Other systems have used polymethylmethacrylate, polyoxymethylene, polyvinyl butyral or a phenoxy resin as the backbone and polyethylene glycol as the extractable phase. Other systems have used polystyrene as the backbone and mixture of oils or waxes as the extractable phases.

These systems all have in common the use of a much lower molecular weight extractable phase to plasticize the higher molecular weight backbone phase. There are two main detriments to this approach. The first is that the extreme plasticization of the backbone by a much lower molecular weight material greatly weakens the overall strength of the binder. The second is that even though the viscosity has been lowered drastically, the backbone molecules are still long enough to require high shear rates to achieve a usable viscosity for injection molding. Feedstock formulated with approach will exhibit significant shear thinning behavior.

Other formulations use a catalytic debinding approach. This approach catalytically decomposes the extractable phase, essentially reverting the polymer to its monomer or other relatively small, volatile molecules. Higher molecular weights can be used and these binders typically have very high green strengths. Commercially available systems incorporating this design use polyoxymethylene as the extractable phase and a polyolefin as the backbone. Because of their high molecular weight these binders exhibit shear-thinning behavior.

Another formulation approach is to use a gelation type binder. The extractable phase in this case is most often water. Often a polysaccharide or cellulose based material is used as the backbone. The materials are combined to form a gel, which when subjected to shear during injection, breaks up to allow flow. After injection the material gels again to form the molded article. The extractable phase (water) is then removed by a drying step. Gelation binders such as these rely on a shear thinning mechanism during the transition from rigid gel to moldable material. These formulations exhibit a lack of strength out of the mold and process control issues related to evaporation of the extractable phase prior to processing.

All of these designs are approaches to forming sinterable powders. In practice, the injection molding of powders is complicated by many processing details related to avoiding the initiation of flaws during the forming and subsequent debinding and sintering of parts. One of the main challenges is the injection molding process itself. Because of their shear-thinning behavior, these formulations all require high shear rates to achieve a sufficiently low viscosity during molding. High shear rates are achieved by using high injection speeds. Many of the challenges presented by the injection molding process are rooted in the use of binders requiring high shear rates to achieve low viscosities and the high speeds that must accompany these high shear rates.

When a binder is subjected to high shear rates the material can be rapidly overheated in isolated spots throughout the bulk. Shear heating such as this can be very detrimental to the components of the binder system. Lower molecular weight materials such as additives or plasticizers can easily be volatilized when subjected to shear heating. During processing significant internal vapor pressure can be generated due to the shear heating of these more volatile components. These pressures, combined with the low strength of the binder in its molten or partially solidified state, can result in defects such as surface blisters or internal delaminations. Shear heating is not only detrimental to the lower molecular weight additives in a formulation, but also to the polymeric materials which give a formulation its strength. Shear heating can degrade the polymeric molecules, breaking the polymers down into lower molecular weight materials of different viscosities and strengths. This not only yields a part with compromised binder components, but also aggravates the differences between virgin material and material that has previously been molded, presenting a difficulty to the processor.

A second general set of consequences resulting from the speed used to shear thin prior art materials is rooted in the density differences between the powder being formed and the binder being used to form it. When a powder binder mixture is injection molded it must often be subjected to changes in direction. Because of the inertial differences between the powder and the binder, the powder will tend to resist directional changes more than the binder, resulting in an undesirable separation of powder and binder.

Another consequence of shear thinning binders and the concomitant high injection speeds is the difficulty of establishing a controlled melt front. Many molded parts are desired to be free of internal voids. In order to mold a void free part a controlled melt front must be established to allow the part to fill without the melt jetting or splashing around in the mold cavity. As soon as jetting occurs, air can be entrapped in the melt and it becomes very difficult to mold a void free part. By avoiding high speeds the melt front can be much more easily controlled and void free parts molded. Also, the challenges of molding a large void free part can be more easily overcome because of the ease of controlling a low speed melt front.

The practical implications of the need for high shear rate due to the shear thinning nature of prior art binders are presented not only by processing concerns regarding the feedstock itself but also by special requirements of processing equipment.

The previous discussions have addressed the problems encountered in the feedstock or molded part when using high shear rates to injection mold. Other problems arise from the process rather than the product side. High injection rates require much higher degrees of control in the injection molding equipment. Prior to the filling of the mold cavity, the injection rate must be slowed down to allow for flash free parts. If the cavity fills at too high of a speed, the melt slams into the parting lines, slides, and vents of the mold, creating undesirable flash and cleaning issues. The use of high injection rates creates the need for high speed controls, which increases the cost of the manufacturing equipment. Additionally, in practice high speed controls may still be inadequate to eliminate the discussed problems.

The use of binders that incorporate a shear thinning mechanism to achieve low viscosity is fraught with many technical problems. These problems are rooted in the high speeds needed shear thin the binders and allow the powder/binder mixture to be molded. Some formulations have low shear-thinning behavior due to the inclusion of large amount of low molecular weight wax. These systems are extremely weak because of the low strength of the waxes. Low strength greatly impedes molding, handling and processing.

It is an object of this invention to provide a process to formulate a multiple phase binder for sinterable powder in such a manner that shear thinning behavior is reduced or eliminated in order to allow powder/binder mixture to demonstrate low viscosities at low shear rates. This is achieved by the tailoring of the molecular weight and the molecular weight distribution of the polymers constituting the extractable and backbone phases of the binder. It is another object of this invention to provide a process to formulate binders of high strength.

The concept of tailoring the molecular weight of the binder phases to provide these more desirable flow properties can be applied to many different binder chemistries. Many formulations have been concerned primarily with the debinding mechanism. Flow properties were achieved secondarily by the addition of plasticizers or surfactants. A binder designed from this approach is severely limited because the incorporation of plasticizers tends to weaken the polymer matrix, which is already severely weakened by the inclusion of 45 to 75 vol. % sinterable powder. Also, because the flow behavior has not been considered from the onset, the debinding mechanism, however clever, is still used in the context of a shear thinning binder system.

In order to allow the extraction of one phase from another, the phases need to be chemically different from one another. FIG. 1 depicts an interface between these different phases. 1.1 represents the backbone phase of the binder and 1.2 represents the extractable phase. The space between them (1.3) represents the interface. Because of the chemical differences between phases there also exists an interfacial tension between the polymeric phases of a binder. Reducing this tension will reduce the overall viscosity of the binder system and allow it to be more easily formed. Previous work has addressed reducing this interfacial tension through the use of certain chemicals as compatibilizers. For example, U.S. Pat. No. 5,641,920 to Hens cites the use of a small molecule such as monoglycerol monostearate to compatibilize and also plasticize the binder. This approach can achieve lower viscosity by introducing a third phase that is compatible to some extent with both major phases; this molecule allows slippage of the phases by one another by introducing a mutually compatible chemical at the phase interface.

The difficulty with using chemical compatibilizers is that the placement of a small molecule between the phases of the macro-molecular matrix significantly compromises the overall strength of the binder. While a chemical compatibilizer may have an affinity for both binder phases and can reside at the interface of these phases, it lacks the mechanical length to extend into the phases. By residing at the interface they reduce the tension between the phases but also reduce the strength of the binder by introducing a non-interpenetrating layer between binder phases. FIG. 2 illustrates a phase interface in a binder system incorporating a chemical compatibilizer. The backbone phase is represented by 2.1, and the extractable phase is represented by 2.2. The space between these phases (2.3) represents the phase interface. The chemical compatibilizer molecules are represented as 2.4. These molecules reside at the phase interface but do not extend significantly into either phase.

Chemical compatibilizers are short molecules that can have a significant vapor pressure at the processing temperatures. In addition to direct temperature affects, heating due to the shear present in binder assisted forming processes can also contribute to the volatilization of these molecules. During processing significant internal vapor pressure can be generated due to the inclusion of these prior art chemical compatibilizers. At many points during processing the binder is in a molten or partially solidified state. At these points the strength of the binder is very low and even a slight internal pressure can exceed the strength of the binder and cause defects. The combination of reduced strength due to the interfacial presence of these chemicals and their volatile nature can create a situation where blistering and delaminating defects are very easily created. These agents are also cited as plasticizers. While this may reduce the melt viscosity, chemical plasticization of this nature reduces the mechanical properties of the binder system.

An object of this invention is to reduce the interfacial tension between binder phases without compromising the integrity of the binder system by incorporating a polymeric compatibilizer into the binder. This polymeric compatibilizer is a macromolecule containing multiple segments of different chemical natures which are compatible with the different binder phases. A further object of this invention is to use polymeric compatibilizers in polymer alloys to allow for improved mechanical properties of molded components. The use of these materials in filled and unfilled polymer alloys is well documented. However, these applications were intended to optimize the mechanical performance of the molded parts. The prior art does not teach their application in multiphase binders incorporating an extractable phase, nor does it envision their application in the temporary binding of powders. Additionally, the prior art also does not address the application of polymeric compatibilizers for the improvement of the rheological (as opposed to mechanical) behavior of binder formulations for the binder assisted forming of sinterable powders. It is an object of this invention to provide a process to improve the processing behavior of multi-phase binder systems for sinterable powders by reducing the interfacial tension between the phases of the binder system without compromising the performance of the binder system.

An additional challenge to the formation of defect free parts formed using a multiple phase temporary binder is the inherent incompatibility of inorganic powder surfaces with most polymers. Because of these differences it is difficult for the powders to be wetted by the polymeric elements of the binders. This problem is conventionally solved by using a small organic or organometallic molecule with an affinity for both the powder and the binder. Typically one end of these molecules is compatible with the powder surface and the other end compatible with the polymer binder. The molecule orients itself along the powder/binder interface and allows the polymer to wet the particle. There are many names for these molecules, but in this application they all serve a similar purpose. Among the descriptors for molecules acting in this capacity are: surfactant, dispersant, surface active agent and coupling agent. All serve to reduce the interfacial tension between the powder and the binder in which it is dispersed. There are many examples of the use these materials and their application is known to those skilled in the art.

A common attribute of these materials is that the molecules are very small relative to the polymeric binder in which they are used. This is advantageous because the powders are often pretreated with the surfactant prior to being mixed with the polymeric binder and the small size of the molecules allows easy dispersion into the powder because it can generally easily be dissolved in a solvent. Also there are a great many materials available which can perform this function. One of the most prevalent materials used in this application is stearic acid. The carboxylic functionality is polar and is attracted to the hydrophilic powder surfaces. The stearyl tail is hydrophobic and is more compatible with the polymer binder. Glycerol stearate and many other molecules are also used as a surfactant in a similar manner.

Surfactants like these are well suited for use as dispersants in slurries and other low viscosity, low molecular weight mixtures. They have been adapted to polymer blends with some success but they face inherent limitations due to their small size. The short length of the section of the molecule that is compatible with the binder does allow better dispersion of the powder into the binder system by reducing the interfacial tension at the powder binder interface. However, it does not extend significantly into the polymeric matrix. The interfacial tension is reduced, but the link between the two phases, powder and binder, is not especially strong. Composite strength gains are made, but mostly by decreasing powder agglomeration and improving wetting, not by integration of the surfactant into the polymer matrix. Some organometallic molecules, silane compounds in particular have been essentially grafted into the polymer backbone during melt processing. By extending the surfactants reach by joining surfactant to the polymer bulk the mechanical properties are greatly improved because powder/binder interface is better bridged. Because this approach is concerned primarily with mechanical properties and not Theological properties, it has found most of its successes in the field of filled polymers or composites rather than temporary binders for sinterable powders.

Another concern regarding the degree of mechanical extension of the surfactant into the binder system is separation of the powder from the binder during injection molding. Because the surfactant does not extend significantly into the binder it is of limited usefulness in preventing powder binder separation due to inertial differences.

Aside from mechanical extension into the polymer binder, chemical compatibility is also a concern. Although a short organic chain group is much more compatible with a polymer than an inorganic surface, it is by no means necessarily the best choice for compatibility with a polymer. A material's success as surfactant is based on its relative compatibility to the polymeric binders rather than optimum compatibility.

Another concern is that any excess surfactant that is not tied up at the powder/binder interface will end up distributed through out the binder. If the binder is subjected to shear heating, as it will be in most forming processes, these excess very low molecular weight materials can be volatilized, creating a vapor pressure that can cause defects during the forming process.

It is an object of this invention to use polymers as surfactants in temporary binders for the binder assisted forming of sinterable powders. The use of a higher molecular weight material as a surfactant will allow better chemical and mechanical integration of the surfactant into the binder, will reduce the presence of molecules with any considerable vapor pressure and will help the powder binder mixture to resist separation during forming. A further object of this invention is to provide an improved method for predispersing these macromolecules into the powder prior to the compounding of the powder/binder mixture. Another object of this invention is to combine these macromolecular surfactants with conventional surfactants to provide optimum rheological characteristics.

This invention allows the problems presented by the use of conventional surfactant molecules to be avoided while at the same time solving the problems that required the use of the conventional surfactant in the first place. The conventional surfactant is replaced by a macromolecular surfactant.

DESCRIPTION OF THE INVENTION

This invention provides multiple phase binders to allow the reduction or elimination of shear thinning behavior. Tailoring of the molecular weights and the molecular weight distributions of the backbone and the extractable phases can allow for a binder system that exhibits Newtonian or near-Newtonian flow behavior and also demonstrates good mechanical properties.

Figure 1:
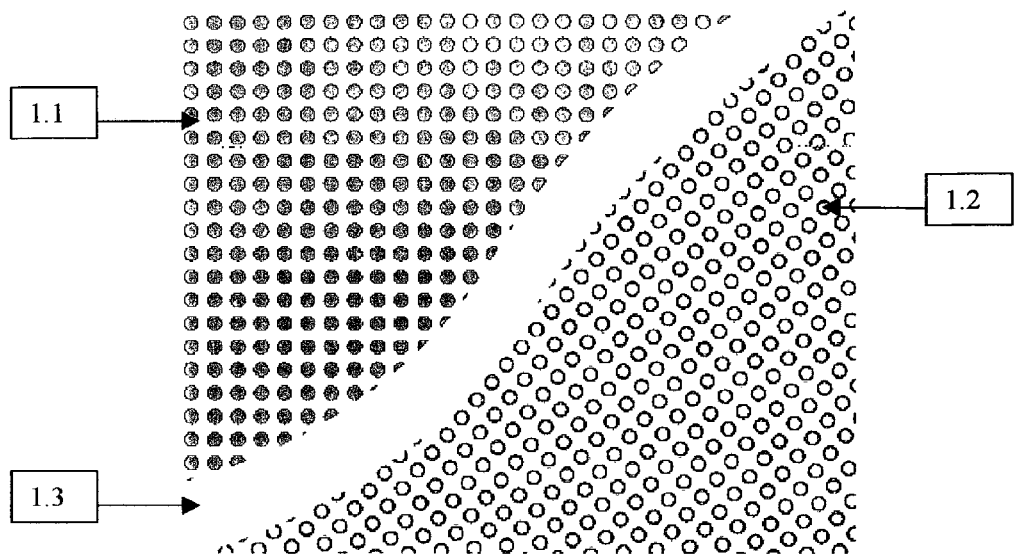
FIG. 1 is a schematic representation of a phase interface of a binder system on a microscopic level. The two major components of the binder, the extractable phase and the backbone phase, represent distinct phases. These polymeric phases are depicted as solid and hollow spheres
Figure 2:
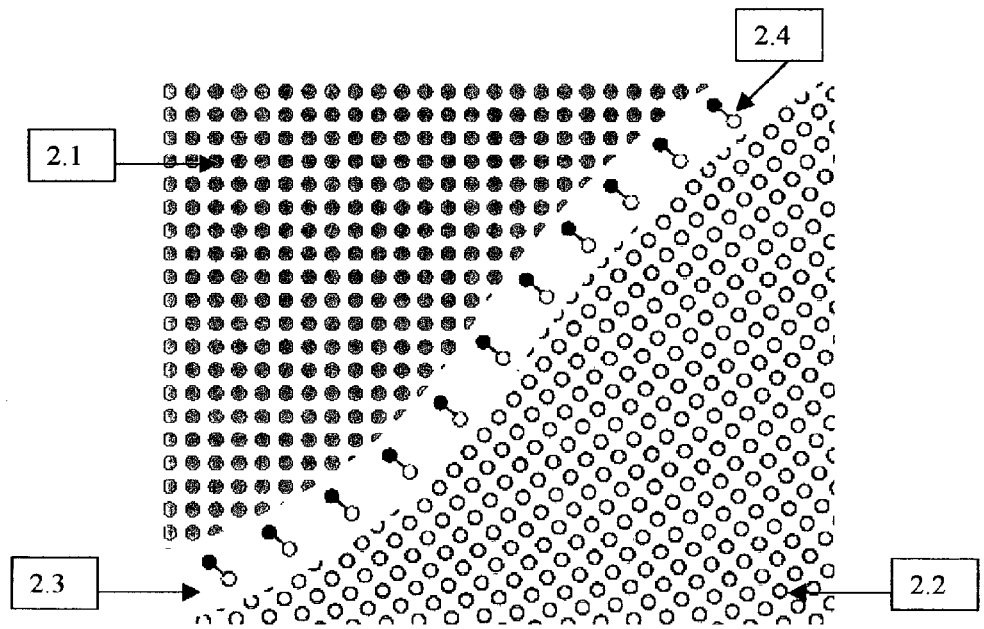
FIG. 2 is a schematic representation of an interface in a binder system incorporating a chemical compatibilizer at the interface between the binder phases.
Figure 3:
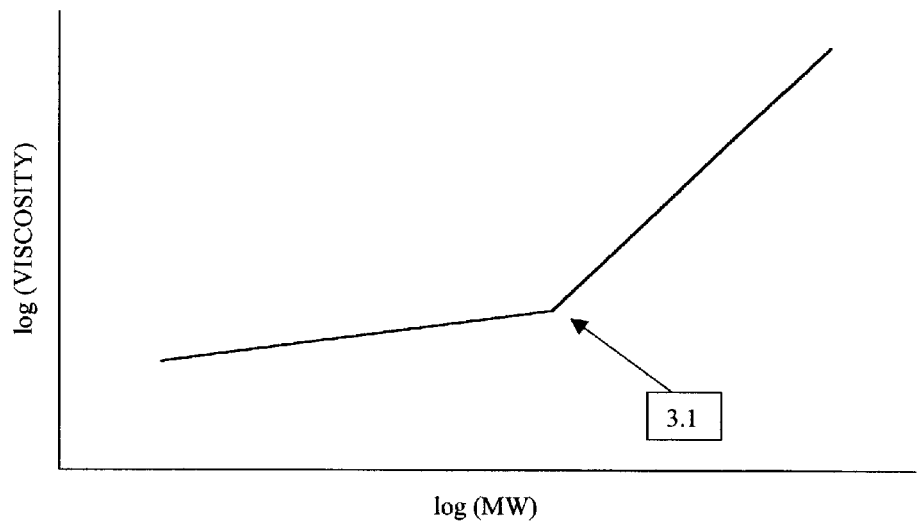
FIG. 3 is a graph of viscosity versus molecular weight. The knee in this curve occurs at the critical entanglement molecular weight.

The flow behavior of polymers has been heavily investigated. Polymeric materials that exhibit viscosity independent of shear rate are said to be exhibit Newtonian flow behavior. These materials exhibit essentially the same viscosity at low shear rates as they do at high shear rates. Polymer melts exhibit Newtonian flow behavior at very low molecular weights. The material will continue to exhibit Newtonian flow as molecular weight increases up to a certain molecular weight. At this molecular weight the material will have sufficient molecular entanglement to demonstrate polymeric properties but also will still exhibit Newtonian flow behavior. This molecular weight is called the Critical Entanglement Molecular Weight (CEMW). FIG. 3 is a graph depicting where the CEMW occurs. As the molecular weight increases the viscosity increases gradually until the CEMW, at this point the chains become much more entangled and the viscosity increases rapidly with further increases in molecular weight. 3.1 indicates the knee in the curve representing the CEMW. At this point the material properties transition from those of a wax-like material to those typically associated with a polymeric material such as higher strength, better flexibility, and toughness. By selecting for the backbone and extractable phases whose molecular weights are near the CEMW, the binder can have both Newtonian flow behavior and improved mechanical properties. In practice the CEMW for this kind of flow behavior in not an exact molecular weight but a narrow molecular weight range.

In order to have the combination of polymeric properties and Newtonian flow, the polymer must not only be near the CEMW but the polymer must have a narrow molecular weight distribution of less than 5.It is desirable to have a distribution width, ($M_w/M_n$) of less than 3.5.

Figure 4:
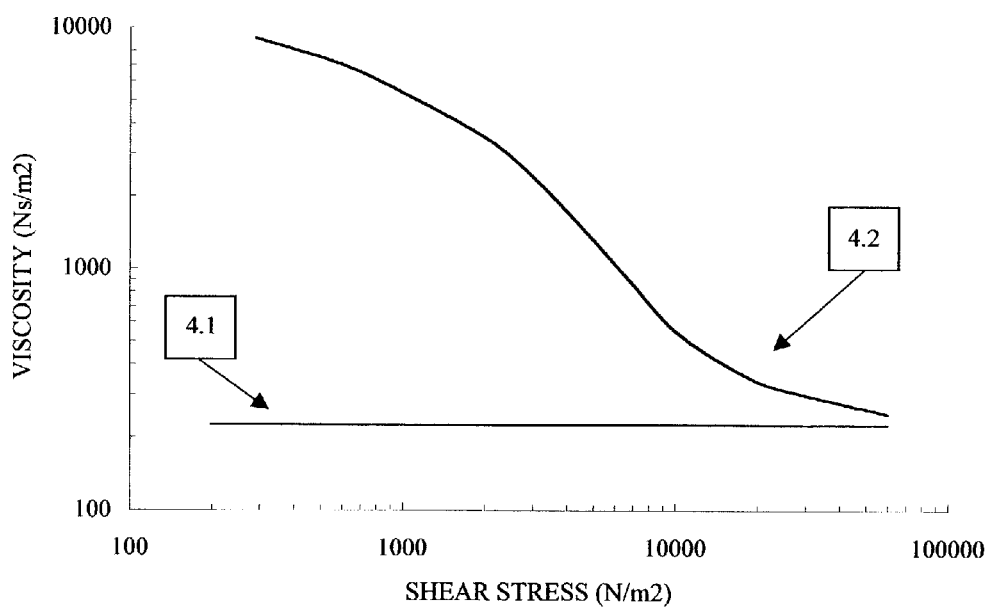
FIG. 4 is a graph if viscosity versus shear stress for two poly(methylmethacrylate) polymers of different distribution widths.

Molecular weight distribution plays an important role in allowing the binder to behave in a Newtonian or near-Newtonian fashion. Two polymers can have approximately the same viscosity when tested in a melt flow index apparatus. However, the viscosity at very low shear stress may be several orders of magnitude higher for the material having a broader molecular weight distribution. Even a small fraction of higher molecular weight material can induce non-Newtonian behavior. FIG. 4 is a graph of viscosity versus shear stress for two poly(methyl methacrylate) polymers.

4.1 shows viscosity independent of shear stress for a low molecular weight poly(methyl methacrylate). The molecular weight distribution of this material was modified by adding 5% high molecular weight material to the polymer. 4.2 shows the effect of the 5% addition; the material now exhibits a viscosity dependent upon shear stress. Additionally, polymers with wider molecular weight distributions are more susceptible to having stresses molded into them. Molded in stresses can resurface during debinding. Upon being relaxed by chemical or thermal means they can distort the molded article.

Figure 5:
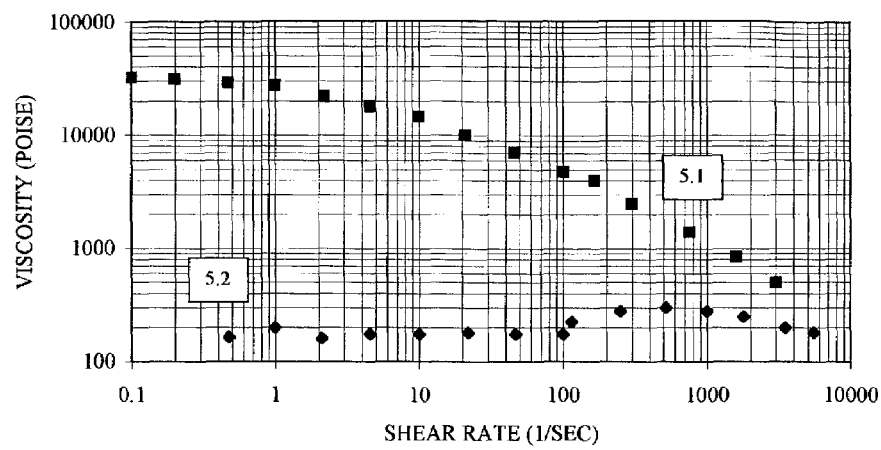
FIG. 5 is a graph of the viscosity versus the shear rate for two polypropylene polymers of different molecular weight and molecular weight distribution.

FIG. 5 illustrates the change in shear behavior made possible by tailoring the molecular weight and molecular weight distribution of a polymer. 5.1 shows the behavior for a conventional low molecular weight injection molding grade polypropylene copolymer. This material has molecular weight of 55,400 and a molecular weight distribution ($M_w/M_n$) of 5.5. As shear rate increases this material exhibits a dramatic drop in viscosity. 3.2 represents a specially tailored polypropylene copolymer. This material has a molecular weight of 22,500 and a molecular weight distribution ($M_w/M_n$) of 2.4. This material exhibits essentially a flat line behavior across the range of shear rates. By precisely adjusting the molecular weight and molecular weight distribution, non-shear-thinning behavior can be attained in a polymer while still retaining adequate mechanical properties.

To reduce shear-thinning behavior, a multiphase binder consisting of two major phases, an extractable phase and a backbone phase, is formulated using polymers of a molecular weight near the critical entanglement molecular weight and having narrow molecular weight distributions. This allows the binder to exhibit Newtonian or near-Newtonian flow properties and avoids the need for detrimentally high shear rates during processing. Also, because both extractable and backbone phases have been tailored, the molded article can have the maximum green strength possible while still possessing the desired flow properties.

The molecular weight used can be optimized by observing the polymers response to capillary rheometry. Molten material is extruded through a capillary and the pressure required to do this at given shear rates is recorded. Data from this type of testing indicate whether the flow behavior is Newtonian, near-Newtonian, or shear-thinning.

In practice, the incorporation of a large volume of powder into the binder can induce some shear-thinning behavior. The degree and significance of this is affected by many factors, including the particle size distribution, particle morphology, surface chemistry, and surfactant modification. It is important to note that the desired result is Newtonian behavior but inclusion of high loading of material can shift the shear behavior slightly making it near-Newtonian. The techniques discussed here are intended to make the binder as Newtonian in behavior as possible. When this binder is combined with powder, the described formulation approach will allow the flow behavior to be as close to optimal as is possible.

Figure 6:
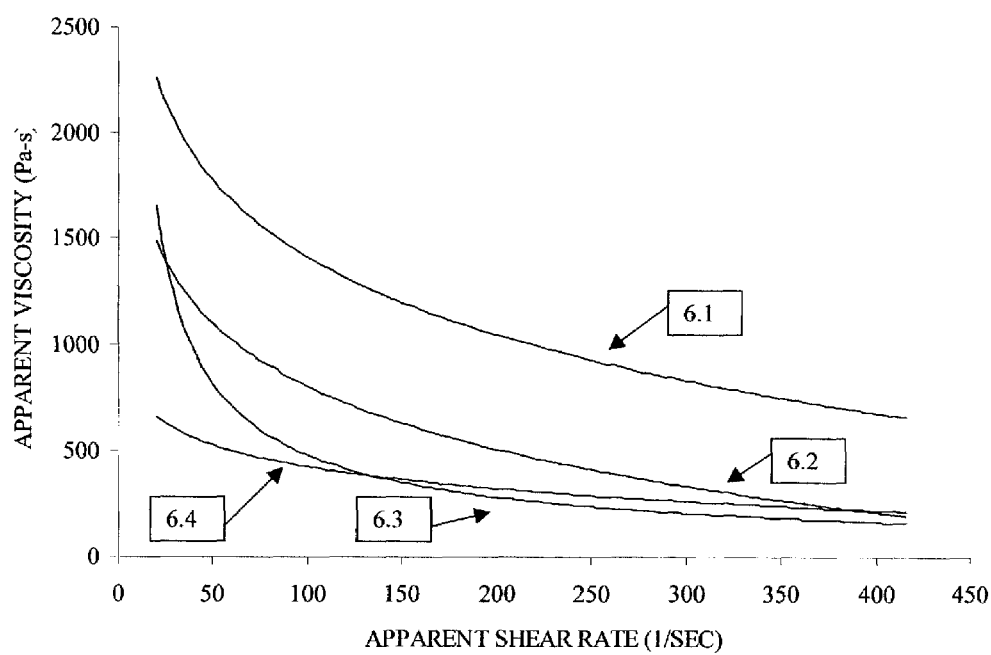
FIG. 6 is a graph of four powder binder mixtures exhibiting different shear induced behavior.

FIG. 6 compares the viscosity behavior for three conventional powder/binder mixtures and one powder/binder mixture using polymers of a tailored molecular weight and molecular weight distribution. Previous work in the field has suggested that feedstocks for the injection molding of powders should have a viscosity below 1000 Pa-s. 6.1 represents a conventional system using polyoxymethylene and a polyolefin as the binder system. 6.2 represents a conventional system using polyvinyl alcohol and a polyolefin as the backbone. 6.3 represents a conventional system using agar and water as the binder system. The conventional chemistries of 6.1, 6.2 and 6.3 all start with viscosities well above 1000 Pa-s and need to be subjected to shear before their viscosity drops. 6.4 represents a system using the described tailored approach. This system contains a polypropylene copolymer and polyethylene glycol having tailored molecular weights and molecular weight distribution. Although 6.2 and 6.3 eventually achieve low viscosity, only 6.4 has a low viscosity over the entire shear range. The viscosity differences at low shear rates are very significant because the final stages of mold filling and packing must take place at low shear rates, therefore the tailored material will allow for better final filling and packing of the mold cavity.

Depending upon the chemical compatibility of the major phases, a polymeric compatibilizer may by included in the formulation to reduce the interfacial tension between the binder phases. The combination of a polyether and a polyolefin in a binder may require the use of a polymeric compatibilizer because of the extreme difference in molecular structure between the phases. An example of this would be a system using polypropylene as the backbone and polyethylene glycol as the extractable phase. However, a system using the combination of two polyethers may have a much higher inherent compatibility between the phase and may not require the use of a polymeric compatibilizer. An example of this would be a system using polyoxymethylene as the backbone and polyethylene glycol as the extractable phase.

Selection of the molecular weight may have limitations due to the commercial availability of the desired polymer. In the case where a grade is not available exactly at the desired molecular weight, a grade close to it may be used. In cases such as this is would be desirable to be slightly lower in molecular weight than higher. This will allow for a slight decrease in binder strength rather than introducing shear thinning behavior. Because of the lack of commercial grades with the described flow properties it may be necessary to used custom made material. The synthesis of these is known to those skilled in the art.

In accordance with one embodiment of this invention polypropylene copolymer is used as the backbone polymer and polyethylene glycol as the extractable phase. The polypropylene copolymer has a molecular weight of 22,500 and a molecular weight distribution ($M_w/M_n$) of about 2.4. The polyethylene glycol has a molecular weight of 20,000 and a molecular weight distribution ($M_w/M_n$) of less than 3.5. A polymeric compatibilizer is also incorporated to reduce the interfacial tension between the major phases. This compatibilizer is a triblock copolymer with ethylene oxide segments on the ends of the polymer chains and propylene oxide segments in the middle of the chain. 40% of the molecule is propylene oxide, distributed equally on the ends of the macromolecule. The copolymer has a molecular weight of 3100. Polypropylene or a polypropylene copolymer having a molecular weight of 22,000 to 23,000 can also be used as the backbone polymer.

In practice, binder formulations can contain many minor components such as surfactants, coupling agents, plasticizers, stabilizers and antioxidants as is well known in the art of filled polymeric materials. The specific powder and binder system used, as well as the application, dictates the selection of these components.

In the a preferred embodiment of a binder for sinterable powders a polyoxymethylene copolymer with a molecular weight of 26,000 and a molecular weight distribution ($M_w/M_n$) of less than 3.5 is used as the backbone. A polyethylene glycol with a molecular weight of 20,000 and a molecular weight distribution ($M_w/M_n$) of less than 3.5 is used as the extractable phase. The binder components are compounded at 160-180° C. Compounding can be performed in a continuous or batch mixer. No polymeric compatibilizer is used in this formulation because of the extreme melt compatibility of the two major binder phases.

| Weight Percent | Component |
| --- | --- |
| 30 | Polyoxymethylene copolymer, 26,000 m.w. |
| 70 | Polyethylene glycol, 20,000 m.w. |

This binder system can be used with many sinterable powders. The specific loading of the powder system in the binder is dependant on many variables well known to those skilled in the art. The most important of these are particle size, particle size distribution, particle morphology and surface chemistry. The specific nature of the powder system used is made compatible with this binder system by the selection of appropriate surfactants, dispersants, or coupling agents. The selection of these surfactants or coupling agents is known to those skilled in the art. Additionally, thermal stabilizers or antioxidants may be added to the binder as required; this is common practice in the field of filled polymers and their incorporation is known to those skilled in the art.

In an embodiment of the feedstock composition the sinterable powder comprises between 50 and 70 volume percent of the feedstock. As percentage of binder weight, the binder constituents comprise from about 25% to about 35% polypropylene copolymer, from about 45% to 65% polyethylene glycol, from about 1% to about 5% ethylene oxide/propylene oxide block copolymer, from about 2% to 6% polypropylene/polytetrahydrofuran graft copolymer, from about 1% to 3% antioxidant or stabilizer and from about 1% to 8% surfactant.

This invention also provides a route to reduce the interfacial tension between phases while still allowing the binder to have the necessary properties. Among these properties are a high green strength and thermal and mechanical stability during the forming process. Additionally the extractable phase must be able to be removed without detriment to the part. Incorporating these requirements into the binder design allows the production of strong defect free parts.

Eliminating the use of a chemical compatibilizer eliminates an overall weakening of the binder due to the low molecular weight species at the binder phase interfaces. Additionally it eliminates defects due to the higher vapor pressure of these materials.

A macromolecule, typically a polymer with differing segments or copolymer, is incorporated into the binder to reduce the interfacial tension between the phases. Because of the segments of differing compatibility these molecules can both reside at and extend across the phase interface, reducing the interfacial tension. Because of the relative length of this molecule, it is structurally integrated into the binder matrix and does not undermine the strength of the binder. Also, because of its high molecular weight it does not have a high vapor pressure that can contribute to defects in the part.

Figure 7:
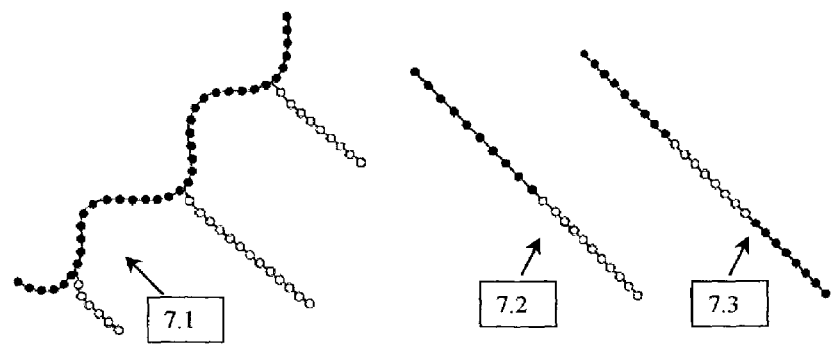
FIG. 7 is a schematic illustration of polymeric compatibilizer structures. The hollow circles depict a polymeric segment of one chemical nature and the solid circles represent a Polymeric segment of a different chemical nature. Structure 7.1 represents a graft copolymer. Structure 7.2 represents a copolymer with a diblock structure. Structure 7.3 represents a copolymer with a triblock structure.

FIG. 7 is a diagram representing three possible structures for polymeric compatibilizers. 7.1 represents a graft copolymer structure. A compatibilizer with a graft copolymer structure typically has a backbone segment of one compatibility with multiple segments of another compatibility extending from the backbone. 7.2 represents a typical diblock copolymer, two segments of differing compatibility are joined to form a single macromolecule with different compatibilities on each end. 7.3 represents a triblock structure. A segment of one compatibility is bracketed on each side by segments of another compatibility. Based upon these depictions many combinations of differing structures can be envisioned. By tailoring some segments of a macromolecule to be compatible with one phase of the binder and other segments to be compatible with another phase of the binder, interfacial tension can be significantly reduced. However, because of the interpenetrating nature of the macromolecule, the mechanical properties of the binder are not significantly compromised. The macromolecule does not merely allow slip between phases but increases ability of the phases to mix with one another and extends into both phases. Instead of weakening the interface by introducing a small molecule with no mechanical extension into the different phases, the interface can be strengthened by introducing a molecule that has some solubility in both phases as well as significant interpenetration of the molecule into the phases. Additionally, these polymeric compatibilizers have much lower vapor pressure and do not generate volatiles that can cause blistering or delaminations.

Figure 8:
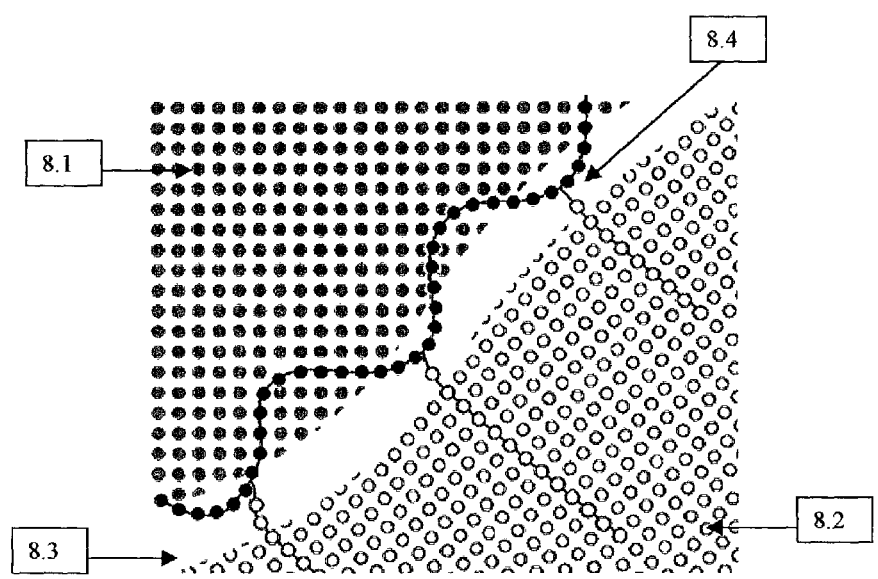
FIG. 8 is a schematic illustration of a phase interface in a binder system incorporating a polymeric compatibilizer with a graft copolymer structure, 7.1 of FIG. 7.
Figure 9:
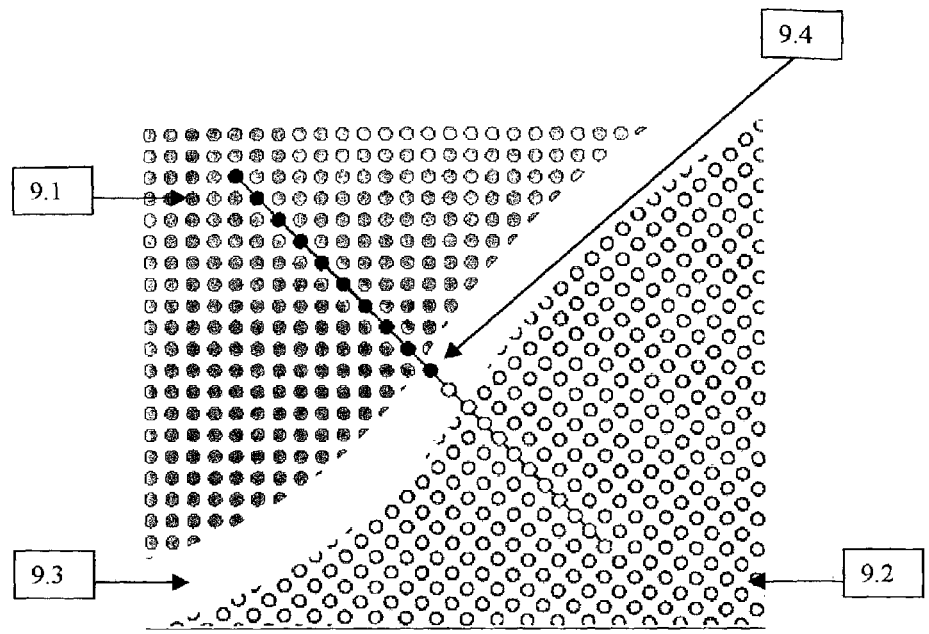
FIG. 9 is a diagram of a phase interface in a binder system incorporating a polymeric compatibilizer with a diblock structure, 7.2 of FIG. 7.
Figure 10:
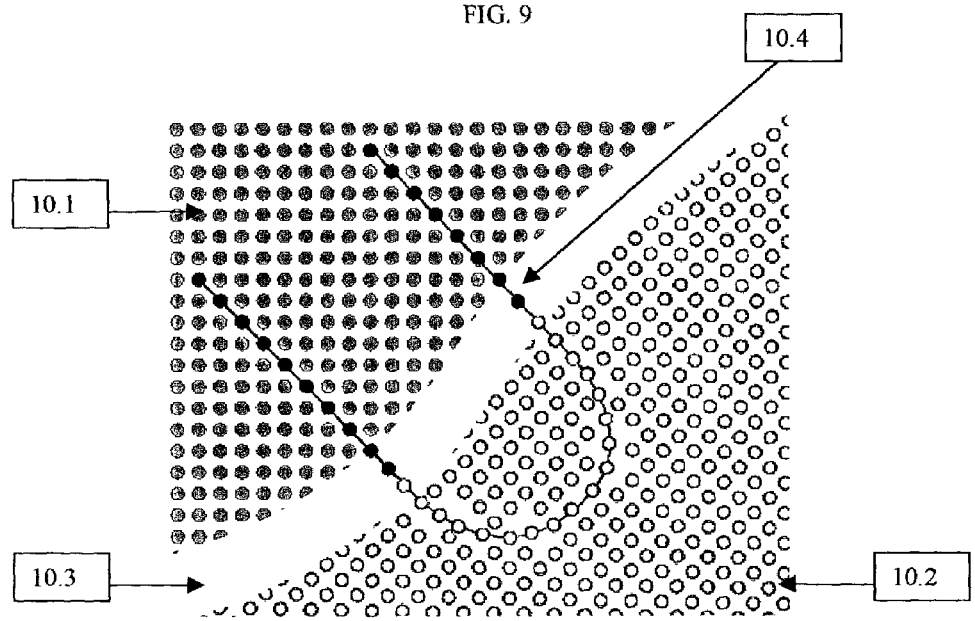
FIG. 10 is a diagram of a phase interface in a binder system incorporating a polymeric compatibilizer with a triblock structure, 7.3 of FIG. 7.

FIGS. 8, 9 and 10 are schematic diagrams illustrating how polymeric compatibilizers of different structures incorporate at the phase interface of a binder system.

FIG. 8 illustrates schematically incorporation of a graft copolymer into a multiple phase binder system. 8.1 represents the backbone phase and 8.2 represents the extractable phase. 8.3 represents the interface between the phases. 8.4 and 8.5 represent portions of a graft copolymer that has been incorporated into the binder. 8.4 represents the portion of the polymeric compatibilizer that is compatible with the backbone phase. 8.5 represents the portion of the polymeric compatibilizer that is compatible with the extractable phase. The portions compatible with the backbone phase extend into the backbone phase and the portions compatible with the extractable phase extend into the extractable phase.

FIG. 9 schematically represents incorporation of a diblock copolymer into a multiple phase binder system, 9.1 represents the backbone phase, 9.2 represents the extractable phase, and 9.3 represents the interface between the phases. 9.4 and 9.5 represent portions of a diblock copolymer that has been incorporated into the binder. 9.4 represents the portion of the polymeric compatibilizer that is compatible with the backbone phase. 9.5 represents the portion of the polymeric compatibilizer that is compatible with the extractable phase. The portions compatible with the backbone phase extend into the backbone phase and the portions compatible with the extractable phase extend into the extractable phase.

FIG. 10 schematically illustrates the incorporation of a triblock copolymer into a multiple phase binder system. 10.1 represents the backbone phase, 10.2 represents the extractable phase, 10.3 represents the interface between the phases. 10.4 and 10.5 represent portions of a triblock copolymer that has been incorporated into the binder. 10.4 represents the portion of the polymeric compatibilizer that is compatible with the backbone phase and 10.5 represents the portion of the polymeric compatibilizer that is compatible with the extractable phase. The portions compatible with the backbone phase extend into the backbone phase and the portions compatible with the extractable phase extend into the extractable phase.

In accordance with an embodiment of the invention a block copolymer is used in a binder system using polyethylene glycol (PEG) as the extractable phase and polypropylene (PP) as the backbone. The copolymer is a block copolymer of ethylene oxide and propylene oxide. The ethylene oxide segments of the block copolymer are more compatible with the PEG while the propylene oxide segments are more compatible with the polypropylene. The structure of the copolymer is a triblock structure with propylene oxide segments on the ends of the polymer chain and ethylene oxide in the middle of the chain. 40% of the molecule is ethylene oxide, distributed equally on the ends of the macromolecule. The copolymer has a molecular weight of 3100. Typically 1 to 5 wt. % compatibilizer is used. Incorporation of this type of block copolymer as a polymeric compatibilizer reduces the overall viscosity of the binder without significant detriment to its mechanical performance or introducing volatile species. Block copolymers such as these are readily available commercially from BASF located in Mount Olive, N.J. or Rhone-Poulenc located in Cranbury, N.J.

In accordance with one embodiment of the process of this invention a graft copolymer is used in a binder system using polyethylene glycol (PEG) as the extractable phase and polypropylene (PP) as the backbone. The graft copolymer has a backbone of polypropylene with polyethylene glycol side groups. The polyethylene glycol functionality is compatible with the PEG constituting the extractable phase and the polypropylene is compatible with the polypropylene backbone phase. The formation of these copolymers is readily known to those skilled in the art. Typically a polyolefin grafted with maleic anhydride groups can be used as the polyolefin backbone. A PEG or other hydroxyl terminated segment is attached to the anhydride group via a ring opening mechanism. This grafting can be performed during the formulation of the binder or the compounding of the feedstock. It can also be performed in a step separate from the formulation of the binder system or compounding of the feedstock.

The synthesis of these graft copolymers may be undertaken in a number of ways. The components can be dissolved in a mutual solvent and reacted. They can also be reacted in bulk in a continuous or batch process, using the reactants as the reaction media. Some reactions may need a catalyst such as para-toluenesulfonic acid. Others, such as the maleic anhydride/PEG system will react readily upon combination in the melt phase. These polymeric compatibilizers can be prepared in a step separate from the preparation of the binder or feedstock, or their synthesis can be incorporated into the process as the binder or feedstock preparation. The preferred route is to prepare the graft copolymer in a step separate from the formulation of the binder or feedstock. A separate preparation of the polymeric compatibilizer precludes the possibility of desired reactions with other binder components.

Since the very nature of most multiphase binder systems requires a significant chemical difference between phases, the approach of using a polymeric compatibilizer can be applied to many multiphase binder systems to reduce interfacial tension. Examples 1-4 demonstrate the application of polymeric compatibilization to several previously taught binder formulations.

EXAMPLE 1

As an example of using an embodiment of this invention a polymeric compatibilizer is used with a binder/powder system using polyethylene as the backbone phase and polyethylene oxide as the extractable phase. A graft copolymer of polypropylpne and polyethylene glycol is used as a polymeric compatibilizer. The polypropylene backbone of the compatibilizer has a molecular weight of 25,000 and contains 2% maleic anhydride grafted onto the chain. The compatibilizer is formed by grafting polyethylene glycol with a molecular weight of 20,000 onto the maleic anhydride site prior to compounding.

| Weight percentage | Component |
|---|---|
| 4.8 | Polyethylene |
| 4.0 | Polyethylene Oxide |
| 0.5 | Polyethylene Glycol/Polypropylene Graft Copolymer |
| 90.7 | Precipitated Copper Powder |

EXAMPLE 2

As an example of using an embodiment of this invention a polymeric compatibilizer is used with a binder/powder system using polyethylene as the backbone phase and polyethylene oxide as the extractable phase. A graft copolymer of polypropylene and polyethylene glycol is used as a polymeric compatibilizer. The polypropylene backbone of the compatibilizer has a molecular weight of 25,000 and contains 2% maleic anhydride grafted onto the chain. The compatibilizer is formed by grafting polyethylene glycol with a molecular weight of 20,000 onto the maleic anhydride site prior to compounding.

| Weight Percentage | Component |
|---|---|
| 5.6 | Polyethylene |
| 5.0 | Polyethylene Oxide |
| 0.6 | Polyethylene Glycol/Polypropylene Graft Copolymer |
| 88.8 | Titanium Hydride Powder |

EXAMPLE 3

As an example of using an embodiment of this invention a polymeric compatibilizer is used with a binder/powder system using polyethylene as the backbone phase and a polyoxymethylene copolymer as the extractable phase. Polyethylene glycol 400 is used as a dispersant. A graft copolymer of polypropylene and polyethylene glycol is used as a polymeric compatibilizer. The polypropylene backbone of the compatibilizer has a molecular weight of 25,000 and contains 2% maleic anhydride grafted onto the chain. The compatibilizer is formed by grafting polyethylene glycol with a molecular weight of 20,000 onto the maleic anhydride site prior to compounding.

| Weight Percentage | Component |
|---|---|
| 9.18 | Polyoxymethylene copolymer |
| 1.19 | Polyethylene |
| 0.69 | Polyethylene Glycol/Polypropylene Graft Copolymer |
| 0.40 | Polyethylene Glycol 400 |
| 88.54 | Iron Powder |

EXAMPLE 4

As an example of using an embodiment of this invention a polymeric compatibilizer is used with a binder/powder system using polyethylene as the backbone phase and a polyvinyl alcohol as the extractable phase. Glycerin and water are added as plasticizers and stearic acid is added as a debinding aid. A graft copolymer of polypropylene and polyethylene glycol is used as a polymeric compatibilizer. The polypropylene backbone of the compatibilizer has a molecular weight of 25,000 and contains 2% maleic anhydride grafted onto the chain. The compatibilizer is formed by grafting polyethylene glycol with a molecular weight of 20,000 onto the maleic anhydride site prior to compounding.

| Weight Percentage | Component |
|---|---|
| 1.02 | Polyethylene |
| 5.25 | Polyvinyl Alcohol |
| 0.52 | Polyethylene Glycol/Polypropylene Graft Copolymer |
| 1.46 | Glycerin |
| 0.37 | Water |
| 0.32 | Stearic Acid |
| 90.83 | Stainless Steel Powder |

In this invention the structure and functionality of these polymeric compatibilizers can be varied to perform with different combinations of backbone and extractable phases. Copolymer structure can manifest itself in many ways. In addition to the tri-block and graft copolymer, a diblock, multi-block or other structure can be utilized. A diblock would have only two segments while a multi-block could have many segments of varying compatibility. The nature of these segments can be varied as well. For example when compatibilizing polypropylene and polyethylene glycol, the segments of the copolymer do not necessarily have to be of the identical chemical structure as the materials being compatibilized. Instead of a polypropylene segment, another polyolefin or compatible material can be used. Instead of a polyethylene glycol segment, another polyether or compatible material can be used. Also, more than one type of compatibilizer may be used in the same formulation.

The molecular weight of the different segments can also be varied to manipulate the behavior of the compatibilizers. Conventional polymer blend practice indicates that polymeric compatibilizers are most effective when the sections of the copolymer are of a higher molecular weight than the corresponding component of the blend. It is important to remember that this guideline is related to applications where the desired result is solely improved mechanical properties. Binder applications are very different because viscosity, as well as strength is a critical consideration. In binder applications the intent is to reduce viscosity without significantly compromising the mechanical properties. In this application the segments of the copolymer can also be as long or shorter than the corresponding component of the binder.

Selection of the appropriate molecular weight of the compatibilizer segments is an important consideration. For example, when using a binder with a water-soluble extractable phase, allowing the compatibilizer to become too hydrophilic can be detrimental to the water debinding characteristics of the binder. A compatibilizer using a backbone of polyethylene with a molecular weight of 3900 and 7 wt % maleic anhydride grafted onto it can be reacted with polyethylene glycol with a molecular weight of 20,000 to form a graft copolymer. This material has excellent compatibilizing ability for a binder utilizing a backbone of 23,000 m.w. polypropylene and an extractable phase of 8000 m.w. polyethylene glycol. Its incorporation will drastically reduce the melt viscosity and improve the molding behavior, however the molded parts can swell or soften during water debinding. By adjusting the ratio of water soluble to water insoluble segments this problem can be eliminated. It has been discovered that by replacing the polypropylene backbone of the compatibilizer with a slightly different polypropylene having a molecular weight of 25,000 with 2 wt % maleic anhydride grafted onto it the ratio of water soluble to water insoluble is decreased and debinding is significantly improved.

Another approach to address the problems with the compatibilizer becoming too hydrophilic is to replace the hydrophilic functionality with a less hydrophilic functionality that still has a compatibility with the hydrophilic phase of the binder. As an example, instead of using polyethylene glycol as the hydrophilic segment of the compatibilizer, polytetrahydrofuran (PTHF) can be used. While polytetrahydrofuran is not water-soluble, it is compatible with polyethylene glycol because of its polyether nature. This approach allows the formation of polymeric compatibilizers without the concern of the compatibilizer becoming too hydrophilic and causing debinding defects. Effective compatibilizers of this nature have been made using a backbone of polypropylene with a molecular weight of 3900 and 7 wt % maleic anhydride grafted onto it and reacting it with 2000 molecular weight polytetrahydrofuran. This compatibilizer is more effective at reducing viscosity than the PP/PEG compatibilizer using the 25,000 molecular weight backbone.

The formulation of the previously described graft copolymer of polypropylene and PTHF is based on a ratio of one PTHF molecule for every maleic anhydride site. For the described molecular weights and maleic anhydride content the weight ratio of grafted polypropylene to PTHF should be 1:3.08.The preparation of this graft copolymer is accomplished heating and stirring the components in bulk at 170-175° C. for 10 minutes. This preparation route is typical for graft copolymers of a hydroxyl terminated polymer and a maleic anhydride grafted polypropylene.

In another embodiment of this invention a graft copolymer is used as a polymeric compatibilizer in a binder system containing polyethylene glycol (PEG) as the extractable phase and polypropylene (PP) as the backbone. The graft copolymer has a backbone of polypropylene with polytetrahydrofuran side groups. The polytetrahydrofuran functionality is compatible with the PEG constituting the extractable phase and the polypropylene is compatible with the polypropylene backbone phase.

In practice, binder formulations can contain many other components such as surfactants, coupling agents, plasticizers, stabilizers and antioxidants as is well known in the art of filled polymeric materials. The selection of these components is dictated by the specific powder and binder system used, as well as the specific application.

In an embodiment of the feedstock composition the sinterable powder comprises between 50 and 70 volume percent of the feedstock. As percentage of binder weight, the binder constituents comprise from about 25% to about 35% polypropylene/polyethylene copolymer, from about 45% to 65% polyethylene glycol, from about 1% to about 5% ethylene oxide/propylene oxide block copolymer, from about 5% to 10% polypropylene/polyethylene glycol graft copolymer, from about 1% to 3% antioxidant or stabilizer and from about 1% to 8% surfactant.

In the preferred embodiment of a binder for sinterable powders two polymeric compatibilizers are used. The previously described graft copolymer of polypropylene and polytetrahydrofuran is used in conjunction with the previously described block copolymer of ethylene oxide and propylene oxide. The graft copolymer should be synthesized prior to adding to the binder compound. The binder components are mixed at 165-180° C. for 5-15 minutes. The mixing can be performed in a batch or continuous mixer.

| Weight Percent | Component |
|---|---|
| 35 | Polypropylene/polyethylene copolymer |
| 54 | Polyethylene glycol |
| 8 | Polypropylene/polytetrahydrofuran graft copolymer |
| 3 | Ethylene oxide/propylene oxide block copolymer |

This binder system can be used with many sinterable powders. The specific loading of the powder system in the binder is dependent on many variables well known to those skilled in the art. The most important of these are particle size, particle size distribution, particle morphology, and surface chemistry. The specific nature of the powder system used is made compatible with this binder system by the selection of appropriate surfactants, dispersants or coupling agents. The selection of these surfactants or coupling agents is known to those skilled in the art. Additionally, thermal stabilizers or antioxidants may be added to the binder as required; this is common practice in the field of filled polymers and the incorporation of these is known to those skilled in the art.

The technique of polymeric compatibilization can be applied to many different binder systems. The specific nature of the binder systems being compatibilized can vary greatly. The application of polymeric compatibilization is independent of the method used to compound the feedstock or remove the extractable phase and can be applied to systems other than those specifically discussed. The nature of this invention can be applied to all multiphase binder systems used in the binder assisted forming of sinterable powders. The field of binder assisted forming encompasses many different forming techniques such as the injection molding, compression molding, compaction, extrusion, or green machining of articles comprised of a powder binder mixture. It also is used to create both porous and non-porous articles.

The use of a macromolecule as a surfactant can solve many of the previously discussed problems with conventional surfactants. A polymer (or macromolecule) does not initially appear to lend itself to surfactant applications between powders and polymeric binders. A conventional surfactant has a head and a tail to the molecule. The head of the molecule is attracted to the powder and the tail is attracted to the polymer. Instead of having one end that is attracted to the powder, polymer can have many sites along the chain that are compatible with the powder surface. At the same time the bulk of the chain can be compatible with the polymeric binder due to chemical similarities between the two. This not only allows many points of compatibility with a powder particle but also considerable extension of the surfactant backbone into the polymer matrix. Typically a macromolecule would have this kind of structure because of the grafting of the sites onto an existing chain or the copolymerization of the sites into the macromolecule.

Additionally a polymer may have a mutual compatibility with both the powder surface and the binder system. This is due to variations in molecular structure such as are present in some polyethers, for example polytetrahydrofuran or polylactone.

During the actual formulation of the powder/binder mixtures it is sometimes desirable to disperse the surfactant into the powder prior to compounding the powder and the binder. This can be done to allow more efficient distribution of the macromolecule, i.e. less of the macromolecule dispersed in the polymer matrix and more of it near the powder surface. Also, if the macromolecule has especially reactive site this can be done to prevent or limit its reaction with phases of the binder rather than the powder surface.

Predispersing the surfactants is often practiced when using conventional surfactants in the fields of filled polymers or composite materials. The practices of predispersion can be applied to macromolecular surfactants. The macromolecule may be ground into a fine particle and dry-blended into the powder prior to compounding. The effectiveness of this is limited by the size of the particle. Alternatively the macromolecule may be dissolved in a solvent and then dispersed in the powder prior to compounding.

The challenges of predispersing these macromolecules into the powder can be overcome by creating an emulsion of the macromolecule in water. Typical emulsion particle sizes are in the nanometer to micron range and typical sinterable powders are in the micron size range. This allows effective dispersion of the macromolecular surfactant in the powder prior to combining the powder with the binder while at the same time avoiding the use or environmentally unfriendly solvents. The water in the emulsion is evaporated during processing and presents no handling or disposal issues.

In one example a polypropylene with a molecular weight of 3900 and 7% maleic anhydride grafted on to it is used to help disperse titanium hydride powder in a binder using polypropylene as the backbone and polyethylene glycol as the extractable phase. This material may be added to the powder in a granular or dissolved form prior or during compounding. It may also be added with the binder prior to compounding. In a more preferred embodiment it may be emulsified in water and dispersed into the powder prior to the powder and binder and compounded.

The use of grafted polymers as macromolecular surfactants has many possible variations. The backbone of a graft copolymer can be selected to be compatible with the backbone of the binder system and reactive sites, such as maleic anhydride grafted onto it to provide sites attracted to the powder surface. For example, a binder system using polyoxymethylene as the backbone phase of the binder could use polytetrahydrofuran with maleic anhydride grafted on to it. The synthesis of these grafted polymers is known to those skilled in the art.

The polymer used as a surfactant can typically have a molecular weight between 2000 and 25,000. Also it would be preferred that the polymer have no cross-linking between the molecules. Branched or linear polymers may be used.

In another embodiment a dicarboxylic acid is used as a surfactant. The use of mono-carboxylic acids such as stearic acid is well known in the art. The carboxylic functionality has a great affinity for inorganic powder surfaces. The aliphatic tail has a compatibility with many non-polar materials used as binder components such as polypropylene or polyethylene and copolymers thereof and paraffin wax. However in blends of material where the aliphatic tail is much more compatible with one phase than another, mono-carboxylic acids can be detrimental to molding behavior because they modify the powder surface to be much more compatible with one phase than another. A solution to this problem is to use a dicarboxylic acid, preferably one with a higher carbon number. One end of the dicarboxylic acid is attracted to the powder surface while the remaining part of the molecule, because of the long aliphatic chain and the carboxylic acid termination, has a compatibility with both polar and non-polar constituents of the binder. This mutual compatibility allows for greatly improved molding behavior. In practice a dimer acid with a carbon number of 36 works very well as a surfactant.

In addition to a polymer with reactive site grafted onto it, the macromolecular surfactant may manifest itself as polymer with an affinity for both the binder and the powder. An example of this kind of macromolecule is polypropylene glycol. The combination of the polyether nature of the backbone and the adjacent methyl groups give this macromolecule unique compatibility with both some metal powders and some polymeric binders. An example of its application would be the use of a polypropylene glycol with a molecular weight of 4000 being used to wet a stainless steel powder in order to disperse it into a binder composed of polypropylene and polyethylene glycol.

Macromolecular surfactants may be combined with conventional surfactants to optimize the rheological and mechanical properties. A macromolecular surfactant such as the previously described maleated polypropylene can impart great hydrophobicity to a particle surface. The minor addition of a conventional surfactant such as glycerol oleate can further improve the blend by increasing wetting.

In a preferred embodiment a macromolecular surfactant is used in conjunction with another surfactant and emulsified. The macromolecular surfactant used is a polypropylene oxide with a molecular weight of 4000 and the surfactant used is a dimer acid with a carbon number of 36. A ratio of 1 part dimer acid to 3 parts polypropylene oxide is used and the emulsion is prepared at 25% solids.

Examples of other molecules having structures that could be used similarly are common. Polytetrahydrofuran has a polyether structure but is also hydrophobic because of the distance between the ether linkages. Due to its structure some areas of the chain are more polar than other areas. Another example of this kind of structure is polylactone which contains ether linkages as well as double bonded oxygen off of the carbon backbone. Again this molecule has unique compatibility characteristics because of variations along its chain.

In the preferred embodiment of the use of a macromolecular surfactant, the macromolecular surfactant is used in conjunction with a conventional surfactant. The powder used was tungsten carbide at 52% solids loading. A polypropylene with a molecular weight of 3900 with 7 wt. % maleic anhydride grafted onto it is used as the macromolecular surfactant. The conventional surfactant used was phenyltrimethoxy silane. The binder uses a backbone of a polypropylene/polyethylene copolymer and an extractable phase of polyethylene glycol. The binder also uses a polymeric compatibilizer.

Both surfactants were preblended into the powder. The silane was dispersed in isopropanol and the macromolecular surfactant was emulsified in water at 25 wt %. After surfactants were blended into the powders the binder components were added and the mixture compounded.

| Weight Percent | Component |
|---|---|
| 27 | Polypropylene/polyethylene copolymer |
| 62.2 | Polyethylene glycol |
| 6 | Polypropylene/polytetrahydrofuran graft copolymer |
| 2.8 | Phenyltrimethoxy silane |
| 2 | Macromolecular surfactant, anhydride grafted polypropylene |

The use of macromolecular surfactants can be applied to many different binder systems. The specific nature of the binder systems can vary greatly. The application of macromolecular surfactants is independent of the method used to compound the feedstock or remove the extractable phase and can be applied to systems other than those specifically discussed. The nature of this invention can be applied to all multiphase binder systems used in the binder assisted forming of sinterable powders. The field of binder assisted forming encompasses many different forming techniques such as the injection molding, compression molding, compaction, extrusion, or green machining of articles comprised of a powder binder mixture. It also is used to create both porous and non-porous articles.

In the preferred embodiment of the described technique of structuring the polymer phases to minimize shear thinning and use of polymeric compatibilizers and the of macromolecular surfactants the following formulation is used:

| Weight Percent | Component |
|---|---|
| 27 | Polypropylene/polyethylene copolymer, m.w. 22,500 [backbone]. |
| 63 | Polyethylene glycol, m.w. 20,000, [extractable phase]. |
| 3 | Polypropylene m.w. 3900/polytetrahydrofuran m.w. 2000 graft copolymer, [polymeric compatibilizer]. |
| 3 | Polypropylene oxide, m.w. 4000, [macromolecular surfactant]. |
| 3 | 7 wt % maleic anhydride grafted polypropylene 3900 m.w., [macromolecular surfactant]. |
| 3 | Branched alcohol, carbon number 32 [surfactant]. |
| 1 | Dimer acid, carbon number 36, [surfactant]. |
| 0.5 | Pentaerythritol tetrakis(3-(3,5-di-tert-butyl-4-hydroxyphenol)proprionate), [anti-oxidant]. |
| 0.5 | 2',3-bis((3-(3,5-di-tert-butyl-4-hydroxyphenyl)propionyl)) propionohydrazide, [anti-oxidant]. |
| 0.2 | Tris(2,4-ditert-butylphenyl)phosphite, [anti-oxidant]. |
| 0.1 | Benzenamine, N-phenyl-, reaction products with 2,4,4-trimethylpentene, [anti-oxidant]. |
| 0.1 | Benzenepropanic acid, 3,5-bis (1,1-dimethyl-ethyl)-4-hydroxy-.C7–C9 branched alkyl esters, [anti-oxidant]. |

In the above formulation the polypropylene oxide and the dimer acid are emulsified together at 25% solids. The maleic anhydride grafted polypropylene is also emulsified at 25% solids. The remaining components are blended together at 150-160° C. cooled and granulated. Feedstock is prepared by combining the two emulsified components and the remaining binder components with the selected powder mixing at 150-160° C. for 30-60 minutes. This formulation is a very effective binder system for many different powders.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the claims be interpreted as covering all alterations and modifications as fall within the true spirit and scope of the invention.

This invention includes binder compositions, binder and powder compositions and methods for making such compositions. Binder plus powder compositions are often referred to as feedstock compositions. In the practice of the invention polymeric compositions referred to as compatibilizers are incorporated in the binder to facilitate admixing of the two major phases of the binder, the backbone phase and the extractable phase. Because of chemical differences between these phases there is an interfacial tension at the adjacent surfaces where the phases are in contact which maintains them as separate phases. The compatibilizers are macromolecules which contain multiple segments of differing chemical characteristics or functionality which are compatible with each of the major phases. They reduce the interfacial tension between the phases and reduce any tendency for phase separation while maintaining the rheological and mechanical properties necessary produce strong and flaw free green molded bodies for subsequent sintering.

In conjunction with the polymeric compatibilizer, the invention includes use of backbone phase and extractable phase materials which exhibit newtonion or near newtonion flow characteristics. This permits the powder and binder admixture to have low viscosity at low shear rates avoiding the need for high rate shear thinning. The polymeric binder materials are selected to provide a narrow molecular weight distribution for each phase material at the critical entanglement molecular weight. The polymers exhibit newtonion flow below the critical entanglement molecular weight. As polymer chain length increases entanglement of the polymer molecules and viscosity of a polymer melt increase.

A polymer material is generally a mixture of the polymer molecules having various individual molecular sizes and molecular weights. The term polydispersity is used to represent what is essentially a measure of the width of the molecular weight distribution for a named polymer on a bell shaped curve and is expressed as the ratio of weight average to number average molecular weights. A polydispersity of less than about 3.5 is preferred in the practice of this invention in order to diminish the need for high shear rates to control viscosity during molding. Among preferred binder components are polyoxymethylene copolymers having a molecular weight of about 26,000 as the backbone phase and as the extractable phase polyethylene glycol having a molecular weight of about 20,000 are particularly preferred. A polypropylene copolymer of a molecular weight of about 22,500 is also particularly preferred. The binder major components generally comprise about 30 weight percent backbone phase component and about 70 weight percent extractable phase component. In combination with the herein described compatibilizrs and molecular weight tailored major binder components, the instant invention includes macromolecular surface active polymer materials having chemical functions which allow them to act as surface active agents to reduce separation tendency between binder components by reducing interfacial tension between the phases of the binder. In addition to interfacial tension reduction and molecular weight tailoring the present invention, includes using a macromolecular surface-active polymeric material to reduce any tendency of the binder components and powder to separate during forming of the part. Generally it is preferred to predisperse the surface-active material in the powder prior to compounding of the binder powder admixture. The polymeric surface-active material can be emulsified in water and then admixed with the powder.

What is claimed:

1. A multi-phase temporary binder composition for binder assisted forming of sinterable powders comprising a polymeric backbone phase and a polymeric extractable phase, the composition and each polymeric phase characterized by newtonion or near newtonion flow behavior, a narrow molecular weight distribution, and an average molecular weight of about the critical entanglement molecular weight.

2. The binder composition according to claim 1 including a polymeric compatibilizer.

3. The binder composition according to claim 1 including a macromolecular surfactant.

4. The binder composition according to claim 1 including a polymeric surfactant and a polymeric compatibilizer.

5. The binder composition according to claim 4 including a macromolecular surfactant.

6. The multiphase temporary binder composition according to claim 1, comprising a backbone phase of polyoxymethylene having a molecular weight of about 26,000, polypropylene or polypropylene copolymer having a molecular weight of about 22,000 to 23,000 as the backbone phase and polyethylene glycol having a molecular weight of about 20,000 as the extractable phase.

7. The temporary binder composition according to claim 2 in which the polymeric compatibilizer is selected from the group consisting of polypropylene molecular weight 3900 grafted with polytetrahydrofuran molecular weight 2000, polypropylene molecular weight 25,000 grafted with polyethylene glycol 20,000, and ethylene oxide/propylene oxide block copolymer 3100.

8. The binder composition according to claim 6, wherein the backbone phase is about 25 to 35 weight percent and the extractable phase is about 65 to 75 weight percent of the binder polymer material.

9. A sinterable powder feedstock comprising a multiphase temporary binder according to claim 1 and a sinterable powder comprising from about 45 to about 75 volume percent of the feedstock.

10. A sinterable powder feedstock comprising a multiphase temporary binder according to claim 2 and a sinterable powder comprising from about 45 to about 75 volume percent of the feedstock.

11. A sinterable powder feedstock comprising a multiphase temporary binder according to claim 3 and a sinterable powder comprising from about 45 to about 75 volume percent of the feedstock.

12. A sinterable powder feedstock comprising a polymeric backbone phase, a polymeric extractable phase according to claim 1, a sinterable metal or metal alloy powder, and a macromolecular polymer surfactant composition which is compatible with the polymeric components of the binder phases and also with the sinterable powder component of the feedstock.

13. A multiphase polymeric binder composition for binder assisted forming of sinterable powder feedstock formulations comprising a polymeric binder composition according to claim 1 and polymeric macromolecular compatibilizer having multiple segments some of which are compatible with the backbone phase and others of which are compatible with the extractable phase.

14. The binder composition according to claim 5 wherein the macromolecular surfactant is polypropylene glycol, polypropylene with grafted maleic anhydride, or polypropylene glycol and a dimer acid.

15. The multiphase binder composition according to claim 2 wherein the backbone phase is polypropylene and the extractable phase is polyethylene glycol, and the compatibilizer is a copolymer of ethylene oxide and propylene oxide.

16. The multiphase binder composition of claim 7 wherein the block copolymer is a triblock having propylene oxide segments at the chain and ethylene oxide segments in the middle of the chain, having a molecular weight of about 3100 with about 40 percent of the molecule being derived from ethylene oxide.

17. The binder composition of claim 7 wherein the compatibilizer is a graft copolymer having a backbone chain of polypropylene with polyethylene glycol side chains.

18. A binder feedstock composition comprising between 45 and 75 volume percent sinterable powder and, the balance, binder constituents according to claim 1 comprising, as percentage of binder weight, from about 25% to about 35% polypropylene copolymer, from about 45% to 65% polyethylene glycol, from about 1% to about 5% ethylene oxide/propylene oxide block copolymer, from about 5% to 10% polypropylene/polyethylene glycol graft copolymer, from about 1% to 3% antioxidant or stabilizer and from about 1% to 8% surfactant.

19. The binder composition for binder assisted formation of sinterable powder according to claim 1 comprising a backbone phase comprising a polypropylene/ polyethylene copolymer, an extractable phase comprising polyethylene glycol, a first compatibilizer comprising polypropylene/ polytetrahydrofuran graft copolymer, and a second compatibilizer comprising an ethylene oxide/propylene oxide copolymer.

20. The method for making a multi-phase temporary binder composition according to claim 1 for binder assisted forming of sinterable powders comprising selecting a polymeric backbone phase and selecting a polymeric extractable phase, the composition and each polymeric phase characterized by newtonion or near newtonion flow behavior, a narrow molecular weight distribution, and an average molecular weight of about the critical entanglement molecular weight and admixing the selected phase polymers to provide said temporary binder composition.

21. A method for making a feedstock composition including a sinterable powder and a multiphase polymeric binder composition according to claim 1 and a polymeric macromolecule having attributes of functionality as surface active agents at the surface of the sinterable powder and the multiphase binder, said method comprising predispersing the macromolecule and optionally any conventional surfactant as an emulsion into the sinterable powder prior compounding the feedstock composition.

22. The method for making a feedstock composition according to claim 21 wherein the sinterable powder comprises from about 45 to about 75 volume percent of the feedstock.

23. The temporary binder composition according to claim 1 comprising a polypropylene copolymer at a molecular weight of 22,500 at a weight percentage of 27 percent, a polyethylene glycol at a molecular weight of 20,000 at a weight percentage of 63 percent, a graft copolymer of polypropylene at a molecular weight of 3900 and polytetrahydrofuran at a molecular weight of 2000 at a weight percentage of 3 percent, a polypropylene oxide at a molecular weight of 4000 at a weight percentage of 3 percent, a maleic anhydride grafted polypropylene at a molecular weight of 3900 at a weight percentage of 3 percent and a dimer acid of a carbon length of 36 at a weight percentage of 1 percent.

24. The binder composition according to claim 1 comprising a polypropylene copolymer at a molecular weight of 22,500 at a weight percentage of 27 percent, a polyethylene glycol at a molecular weight of 20,000 at a weight percentage of 62.2 percent, a graft copolymer of polypropylene at a molecular weight of 3900 and polytetrahydrofuran at a molecular weight of 2000 at a weight percentage of 6 percent, a phenyltrimethoxy silane at a weight percentage of 2.8 percent and a maleic anhydride grafted polypropylene at a molecular weight of 3900 at a weight percentage of 2 percent.

25. The binder composition of claim 7 wherein the compatibilizer is a graft copolymer having a backbone chain of polytetrahydrofuran with polyethylene glycol side chains.

26. The binder composition according to claim 1 wherein the molecular weight distribution width is less than 3.5.

27. A multi-phase temporary binder composition for binder assisted forming of sinterable powders comprising a polymeric backbone phase and a polymeric extractable phase and a polymeric compatibilizer, the composition and each polymeric phase characterized by Newtonian or near Newtonian flow behavior, a narrow molecular weight distribution, and an average molecular weight of about the critical entanglement molecular weight.

28. The binder composition according to claim 27 comprising a conventional surfactant.

29. The binder composition according to claim 27 comprising a polypropylene copolymer at a molecular weight of 22,500 at a weight percentage of 27 percent, a polyethylene glycol at a molecular weight of 8,000 at a weight percentage of 62.2 percent, a graft copolymer of polypropylene at a molecular weight of 3900 and polytetrahydrofuran at a molecular weight of 2000 at a weight percentage of 6 percent, a phenyltrimethoxy silane at a weight percentage of 2.8 percent and a maleic anhydride grafted polypropylene at a molecular weight of 3900 at a weight percentage of 2 percent.

30. A method for making a feedstock composition including a sinterable powder and a multiphase polymeric binder composition according to claim 27 and a polymeric macromolecule having attributes of functionality as surface active agents at the surface of the sinterable powder and the multiphase binder, said method comprising predispersing the macromolecule and optionally any conventional surfactant as an emulsion into the sinterable powder prior compounding the feedstock composition.

31. A method for making a feedstock composition including a sinterable powder and a multiphase polymeric binder composition characterized by newtonion or near newtonion flow behavior, and a polymeric macromolecule having attributes of functionality as surface active agents at the surface of the sinterable powder and the multiphase binder, said method comprising predispersing the macromolecule and optionally any conventional surfactant as an emulsion into the sinterable powder prior compounding the feedstock composition.

* * * * *

UNITED STATES PATENT AND TRADEMARK OFFICE
CERTIFICATE OF CORRECTION

PATENT NO. : 7,326,274 B2
APPLICATION NO. : 10/272798
DATED : February 5, 2008
INVENTOR(S) : Joseph A. Grohowski It is certified that error appears in the above-identified patent and that said Letters Patent is hereby corrected as shown below:

In column 4, line 13, below "system." insert -- In addition to the problems presented by the formulation of shear thinning binders, there are many other concerns in the formulation of binders for the binder assisted forming of sinterable powders. One of the primary challenges is the removal of the temporary binder from the formed part. A typical binder will have an extractable phase and a backbone phase. The extractable phase is removed first in order to facilitate the removal of the backbone phase. After the removal of the extractable phase the remaining binder is generally thermally decomposed in a final step, leaving the part essentially free of the binder that was used to form it. In order to facilitate this approach the phases of the binder must be different enough chemically so that the backbone phase is not disturbed or altered during the removal of the extractable phase. For instance, if a solvent extraction approach is used, the solvent should not have solubility in the chosen backbone phase, otherwise the backbone can swell or soften, distorting the part. --.

In column 6, lines 13-14, delete "Theological" and insert -- rheological --, therefor.

In column 7, line 15, delete "Polymeric" and insert -- polymeric --, therefor.

In column 8, line 2, delete "5.It" and insert -- 5. It --, therefor.

In column 8, lines 14-24, below "polymers." delete "4.1 shows viscosity ........................ molded article." and insert the same after "polymers." on Col. 8, line 13, as a continuation of the same paragraph.

In column 9, line 58, delete "2.4.The" and insert -- 2.4. The --, therefor.

In column 9, line 60, delete "3.5.A" and insert -- 3.5. A --, therefor.

In column 9, line 67, delete "3100.Polypropylene" and insert -- 3100. Polypropylene --, therefor.

In column 12, line 26, delete "3100.Typically" and insert -- 3100. Typically --, therefor.

In column 13, line 15, delete "polypropylpne" and insert -- polypropylene --, therefor.

In column 15, line 52, delete "1:3.08.The" and insert -- 1:3.08. The --, therefor.

UNITED STATES PATENT AND TRADEMARK OFFICE
CERTIFICATE OF CORRECTION

PATENT NO.        : 7,326,274 B2
APPLICATION NO.   : 10/272798
DATED             : February 5, 2008
INVENTOR(S)       : Joseph A. Grohowski It is certified that error appears in the above-identified patent and that said Letters Patent is hereby corrected as shown below:

In column 17, line 43, delete "or" and insert -- of --, therefor.

In column 17, line 67, delete "25,000.Also" and insert -- 25,000. Also --, therefor.

In column 18, line 47, delete "36.A" and insert -- 36. A --, therefor.

In column 19, line 36, delete "the of" and insert -- the use of --, therefor.

Signed and Sealed this

Fifteenth Day of July, 2008

JON W. DUDAS
*Director of the United States Patent and Trademark Office*